Aug. 31, 1965 L. H. DÜLBERGER 3,204,229
SIGNAL TRANSMITTER
Filed Sept. 9, 1960
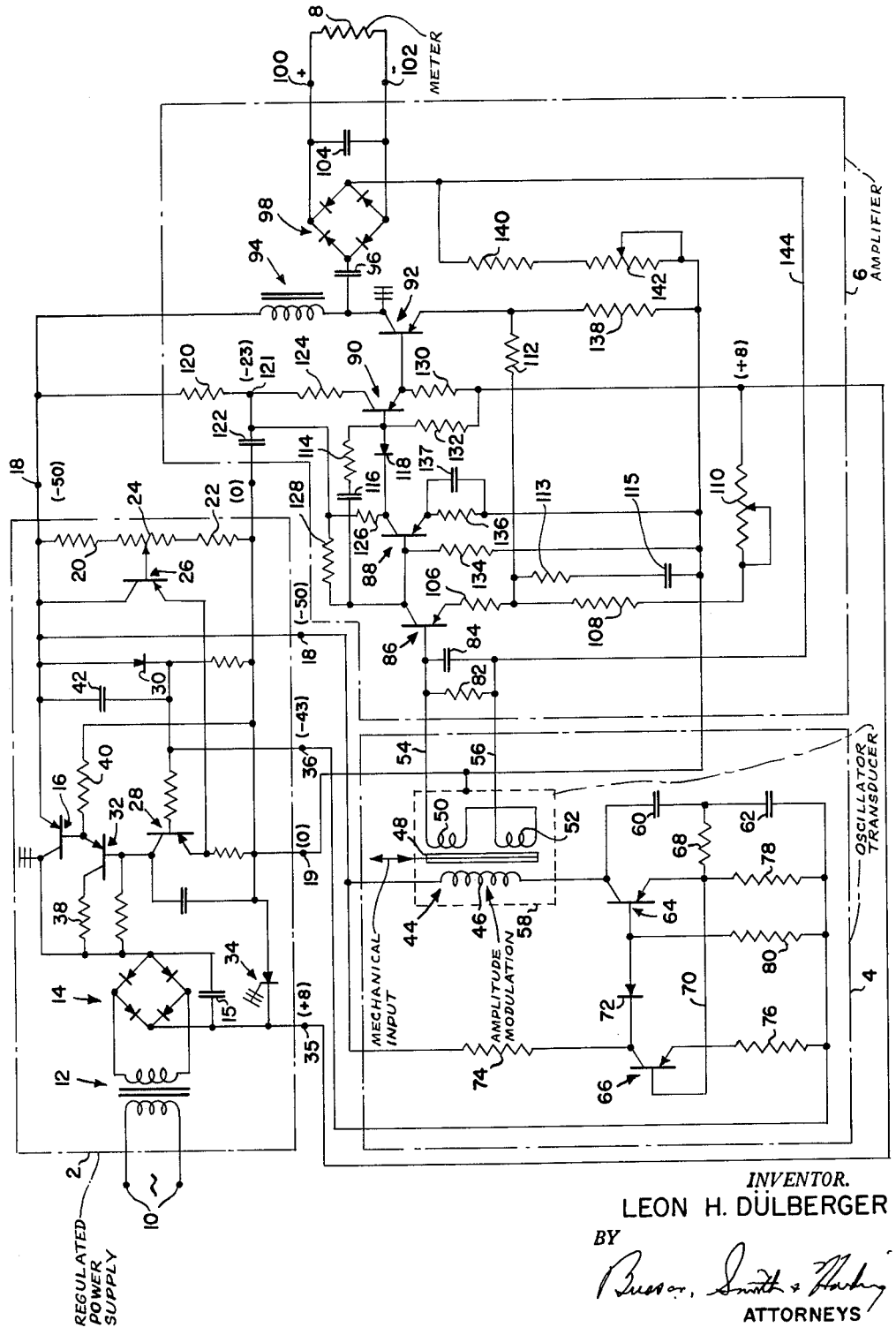
INVENTOR.
LEON H. DÜLBERGER
BY
ATTORNEYS United States Patent Office 3,204,229
Patented Aug. 31, 1965

3,204,229
SIGNAL TRANSMITTER
Leon H. Dülberger, New York, N.Y., assignor to Fischer & Porter Company, Warminster, Pa., a corporation of Pennsylvania
Filed Sept. 9, 1960, Ser. No. 55,001
1 Claim. (Cl. 340—196)

This invention relates to an electronic signal transmitter particularly adapted to provide signal output currents which are linearly related to mechanical movements.

In the case of indicating and/or control apparatus it is frequently desirable to transmit over long distances electrical signals which vary linearly with movements of some mechanical elements such as those of flowmeters, force-measuring devices, temperature-responsive devices, pressure-sensitive elements, or the like. Usually these can be constructed so that an output element has a linear movement which is proportional to some variables to be measured, cams or similar devices being used to secure such proportional movements. The translation of such movements into approximately linearly proportional local electrical outputs can be effected, one of the best means for accomplishing this result being by the use of differential transformers in which core elements have the mechanical movement imparted thereto. Such differential transformers are generally capable of providing linear outputs to an accuracy of about 0.1% throughout their useful ranges of movement which are typically of the order of 0.1 inch. However, when long distance transmission is involved, the ultimate signals are generally rather poor from the standpoint of linearity.

The transmitting circuit has usually been required to be specially tailored with respect to both the ultimate signal-receiving system and with respect to the distances over which transmission was to be effected in view of the variations of impedances of the transmitting lines with distance.

One of the broad objects of the present invention is to provide a transmitter which is highly insensitive to changes in the loads presented thereto. As a result, the same transmitter may be used for transmission of signals over varying distances and different types of lines and to indicating or recording instruments of different types presenting different loads. Specifically, in accordance with the invention, this end is achieved by the provision of a transmitter which, for a given input signal delivers a constant current output irrespective of substantial ranges of variation of impedance presented to the transmitter. Stated in other words, the output of the transmitter present to the receiver what is, in effect, a very high impedance. At the same time heavy currents may be delivered which, through a useful range, may vary in the ratio of around 5 to 1.

The transmitter provided in accordance with the invention, furthermore, may be very easily changed to vary the ranges of currents delivered by the mere substitution of a few inexpensive and simple elements. This latter situation is of great advantage to a manufacturer who supplies a wide variety of indicating or controlling devices requiring divergent ranges of operating current, since the invention makes possible the standardization of the major elements of a transmitter to be used for many types of receivers.

Futhermore, in accordance with the invention high linearity is secured throughout large operating ranges, the linearity being better than that of the available transducers which convert mechanical movement into electrical signals, so that the transducer rather than the transmitter imposes the limits of linearity.

Furthermore, in accordance with the invention, a transmitter is provided which is quite insensitve to temperature changes and to supply line voltage variations.

A further object of the invention is to provide a transmitter having the characteristics indicated above which is completely transistorized and hence is compact and reliable and requires low power input.

The foregoing and other objects of the invention particularly relating to details of construction and operation whereby the aforementioned characteristics are secured will become apparent from the following description read in conjunction with the accompanying drawing in which the figure is a wiring diagram showing the construction of a preferred type of transmitter.

The complete transmitter may be best considered by discussing its three primary elements which are interrelated and consist of a power supply 2, an oscillator-transducer 4, and an amplifier-converter 6 which are respectively shown in the drawing as included within separate blocks delimited by chain lines. Additionally indicated in the drawing is a receiver 8 which, from the electrical standpoint, presents a resistance to which the output current is delivered. This receiver, in effect, is a milliammeter and may be of indicating or recording type or a device which effects control operations in response to current flow. Since this receiver may be of very many types known in the art, it need not be further described, merely presenting, so far as the transmitter is concerned, a resistance which might, in fact, vary with temperature, and may be different in various installations due to differences in transmission distances.

Reference will first be made to the power supply 2 which will be described in detail since it has special cooperation with the other elements to which it supplies power. From a general standpoint, it is an accurately regulated power supply.

Terminals 10 receive alternating current from a commercial supply and there is delivered from a secondary of transformer 12 a suitable alternating voltage to provide direct output potentials of desired values. These are, of course, quite arbitary and subject to choice, but there are indicated at the output terminals of the power supply, in parentheses, typical direct potentials which will serve for discussion. Rectification is accomplished by the bridge 14 of silicon power diodes, and filtering is adequately secured through the use of a large capacitor 15, for example having a capacitance of the order of 100 microfarads. Output voltage control is effected through the use of a series power transistor 16 which may be, for example, be of the type 2N456, provided with a heat sink. This transistor operates as a control series resistance, and in accordance with what will be described maintains the potential at the terminal 18 within 1% of a nominal value which is indicated as −50 volts with respect to a terminal 19 which may be regarded as the zero voltage reference. A series arrangement of fixed resistors 20 and 22 and a potentiometer resistance 24 constitute a voltage divider to provide an error signal at the potentiometer contact which is connected to the base of transistor 26. The emitter of the transistor 26 is connected to the emitter of a second transistor 28, the base of which is connected to the cathode of the temperature compensated reference Zener diode 30 (which may be of type 1N429) the anode of which is connected to the terminal 18. This Zener diode is arranged to be fired in a backward direction at a nominal 6.2 volts D.C. and provides a very accurate reference within ±0.01% The potential at the cathode of this diode may be considered to be −43 volts, assuming that the rise with respect to the nominal −50 volts of terminal 18 is 7 volts. (It should be noted that a reference diode such as this is not important from the standpoint of the particular voltage reference which it supplies, so long as that voltage reference is constant.)

The amplified error signal which appears at the collector of transistor 28 drives the base of the transistor 32 which is connected as an emitter follower. The emitter of the transistor 32 feeds the base of transistor 16 which thus acts as the variable controlling resistance in the supply circuit. It may be noted that the resistor 38 connected to the collector of transistor 32 is of low resistance value compared to that of resistor 40 connected between its emitter and the zero reference. Thus the emitter follower action is achieved.

The terminal 36 is connected to the −43 volt connection previously described. As will shortly appear, the voltage for operation of the oscillator is derived from terminals 18 and 36 and corresponds to the potential drop across the Zener diode 30 which, as pointed out, is held extremely constant. This drop is independent of the other regulating aspects of the power supply.

A Zener diode 34 of the power type (for example 1N1591) provides a positive 8 volts above the zero reference to the terminal 35. Since all of the current passes through this diode 34, it acts to maintain highly constant the potential of the terminal 35. The various resistors and bypass capacitors of the power supply 2 have conventional values suitable for operation of the transistors involved and need not be further described, though it may be remarked that it is desirable to provide approximately 10 microfarads by capacitors 42 bypassing the diode 30.

The unit 4 includes the differential transformer generally indicated at 44. This differential transformer comprises, as usual, the primary winding 46, the movable core 48, and the secondary windings 50 and 52 connected in opposition to provide an output between the lines 54 and 56. The core of the differential transformer is mechanically responsive to the variable which is to be measured, and forms part of the transducer suitable for the particular variable involved. Sometimes differential transformers are used, in conjunction with phase-sensitive devices, through a range on both sides of the null position of the core. In the present apparatus it may be assumed that the useful movement of the core is on only one side of the zero so that the amplitude of the output is utilized without reference to a phase shift through a zero position. If desired, of course, the windings 50 and 52 may be made unequal to make use of the full range of mechanical movement of the core while still avoiding the necessity for taking phase shift into account. Output signal amplitude is alone used in the present apparatus. As is also usual, the differential transformer is shielded as indicated at 58, and this shield is connected to the zero potential reference terminal.

The exciting oscillator for the primary of the differential transformer utilizes this primary as the inductance of the tank circuit, with the capacitances 60 and 62 providing a divider in this circuit. Transistors 64 and 66 are connected as shown, the transistor 64 having its collector connected to one terminal of the primary winding 46 and the emitter of this transistor being connected through resistor 68 to the junction of the two capacitors. The value of resistor 68 may be typical of the order of 82 ohms to play a substantial part in determination of the amplitude of the oscillations. Connection 70 between the emitter of transistor 64 and the base of transistor 66 provides a negative feedback connection to secure linear operation and direct current temperature stability with low distortion of the oscillator wave form. Positive feedback is provided through the silicon diode 72 between the base of transistor 64 and the collector of transistor 66. This diode maintains the necessary direct voltage difference to maintain a proper direct current operating point while at the same time it provides a very low alternating current impedance. The collector resistance 74 (typically 470 ohms) is selected for temperature stability at high current operation of the transistors 64 and 66.

As was previously noted the operating potential difference presented in the supply connections to the oscillator is maintained substantially constant by reason of the fact that it is derived from the connections across the Zener diode. A very high amplitude stability is maintained by the bottoming of the peak negative-going swings of the collector of transistor 64 against the negative supply voltage, the amplitude being maintained constant to within 0.1%. This close control is also promoted by the adequate Q of the tank circuit and the low value of resistor 68. The resistor 76 may have a value of approximately 150 ohms, while the resistor 78 may have a value of approximately 220 ohms, with the resistor 80 having a value of approximately 5,600 ohms, these values being consistent with the use of 2N270 transistors at 64 and 66. The silicon diode 72 may suitably be of the type SG-22.

The frequency may be set by the values of the capacitors 60 and 62 and the inductance of the transformer primary 46. Fine adjustment of frequency may be best achieved by trimming of capacitor 60. In a typical arrangement the frequency of oscillation was 900 cycles per second. The movement of the core through its limited range does not impair either amplitude or frequency stability, the coupling between the core and the primary being small.

The oscillator is characterized by high negative feedback with just sufficient positive feedback to sustain oscillations. High temperature stability exists, and by the overdrive causing the collector of the transistor 64 to have its negative swings limited, the output amplitude is maintained quite constant as previously described.

The alternating output from the differential transformer is delivered through the connections 54 and 56 to an amplifier comprising four transistors. A resistor 82 and capacitor 84 are connected across connections 54 and 56. This network establishes the impedance which the secondary winding of the differential transformer looks into, the resistor 82 loading the secondary to correct for changing characteristic of the differential transformer with temperature. Connection 54 runs to the base of the first transistor 86 which is desirably of the drift type, e.g. 2N247. Connection 56 is connected to a feedback line 144 from a bridge rectifier as hereafter discussed.

The second transistor 88 has its base directly coupled to the collector of transistor 86. The third transistor 90 acts as a follower driver for the power transistor 92. It may be noted that in being thus used as a follower the transistor 90 has its emitter connected to the base of transistor 92, the emitter resistor 130 being of the order of 820 ohms.

The output from the last transistor 92 is delivered through capacitor 96 to the diode bridge 98. An inductance 94 develops the input for this bridge.

A ripple filter is provided by the capacitor 104, of large capacitance, connected across the output terminals of the bridge, direct current output terminals being shown at 100 and 102 for delivery of the measuring output to the indicating or recording apparatus which is indicated by the resistor 8.

The emitter of the transistor 86 is connected through fixed resistors 106 and 108 and adjustable resistor 110 to the positive supply terminal 35. Adjustable resistor 110 serves as a bias adjustment for setting the operating point.

A feedback connection includes the resistor 112 connected between the emitter of transistor 92 and the junction of resistors 106 and 108. This junction is connected through resistor 113 and capacitor 115 to the zero potential terminal 19.

A feedback connection including the series arrangement of resistor 114 and capacitor 116 connects the collector of transistor 86 to the base of transistor 90.

A silicon diode 118 (e.g. of the type SG–22) has its anode connected to the base of transistor 90 and its cathode connected to the collector of transistor 88. This provides a low alternating current impedance but a fixed current drop to maintain proper operating conditions of these two transistors relative to each other.

The resistor 120 provides a voltage difference between the terminal 18 (at −50 volts) and a terminal 121 at −23 volts. A filter capacitance 122 is connected between the terminal 121 and the zero potential terminal.

Resistor 124 is connected between terminal 121 and the collector of transistor 90, while resistors 126 and 128 are connected between the terminal 121 and the respective collectors of the transistors 88 and 86. Resistors 130 and 132 join the termminal 35 respectively to the emitter and base of transistor 90. The base and emitter of the transistor 88 are connected respectively to the zero potential terminal through the resistors 134 and 136. These several resistors provide voltage drops bringing the transistor elements to proper operating conditions.

The resistor 138 connected between the zero potential terminal and the emitter of transistor 92 carries both direct and alternating current and provides negative feedback through resistor 112 to the emitter of transistor 86. (Note that this feedback is negative, despite the even number of stages, due to the fact that transistor 90 operates as a follower, feeding the base of transistor 92 from its emitter rather than from its collector.) The direct current feedback voltage injects a current into the emitter of transistor 86 which is a function of the operating point of the transistor 92. If any of the transistor operating points tends to shift as a result of temperature changes, the direct feedback current will strive to maintain the proper operating points for all of the transistors in the amplifier.

The alternating current feedback in this same loop is partially attenuated to the zero potential reference by the capacitor 115 in series with the resistor 113. The relationship of the capacitive reactance of 115 at the operating frequency and the value of the resistor 113 determines the loop frequency response characteristic at the low frequency end of the pass band to correct for falling amplitude at low frequencies caused by a loss of inductive reactance of the choke 94. Thus even slight changes in operation due to frequency drift of the oscillator are compensated.

Connected between the zero reference and the extreme right-hand terminal of the bridge 98 are the fixed and adjustable resistors 140 and 142 across which there appears an alternating potential connected at 144 to the connection 56 of the differential transformer secondaries. This provides negative alternating current feedback. The alternating feedback voltage thus provided is a function of the alternating signal developed across the output load and provides not only a high input impedance presented to the secondary of the differential transformer, but also provides constant current output at the output terminals 100 and 102. Constant current output as referred to here relates to the maintenance of constant current output for a given input but substantially independent of the load, the amplifier appearing from the output terminals as a high impedance. The feedback also provides a high input impedance.

For a given input the transmitting current may be maintained within 0.1% of the full current even when the output load is completely shorted.

One of the advantages of the arrangement described is that for changes of range it is only necessary to change the resistor 138 and the value of resistance of the combination of resistors 140 and 142. For example, in a typical arrangement such as that described there may be three ranges of currents delivered to the instrument at 8: 10 to 50 milliamperes, 4 to 20 milliamperes, and 1 to 5 milliamperes. Typical load resistor values may be 600 ohms for the first current range, 1,500 ohms for the second current range, and 6,000 ohms for the third current range.

High stability as to frequency response is achieved. There is compensation for high frequency roll off rate. The capacitor 116 in series with the resistor 114 between the collector of transistor 86 and the base of transistor 90 shapes the high frequency band pass of the amplifier in conjunction with the capacitor 137 connected across the resistor 136 in the emitter circuit of the transistor 88.

Gain set or range control is achieved by adjustment of resistor 142.

The exact operating point of the transistors is adjusted by adjustment of the resistor 110.

While there has been indicated above one way of achieving adjustments to various current ranges, the circuit may also have its output range changed by the provision of a shunt resistor in the far end of the transmission lines running from output terminals 100 and 102 in parallel with the recording instrument. In that position the shunting resistor will not change the constant current transmission feature of the apparatus.

It will be clear that various changes in details may be made without departing from the invention as defined in the following claim.

What is claimed is:

In combination, transformer transducer means for converting mechanical movements into amplitude modulated alternating electrical signals, a high gain multistage transistor amplifier having an input terminal connected to said transducer to receive said signals and an output terminal, a diode bridge having a first pair of terminals and a second pair of terminals, a load connected between the terminals of said second pair, said bridge being of a type providing a full wave rectified current to said load when an alternating current is applied between the terminals of said first pair, and connections from the output terminal of the amplifier to said input terminal thereof through the first pair of bridge terminals providing a negative alternating feedback in subtractive relationship with the first mentioned signals so that the resulting input to said amplifier input terminal is the difference of said alternating signals and said alternating feedback and so that the direct component of current through said load is proportional to said alternating feedback.

References Cited by the Examiner

UNITED STATES PATENTS

| | | | |
|---|---|---|---|
| 2,885,660 | 5/59 | Hecox | 340—199 |
| 2,932,817 | 4/60 | Kershaw | 340—209 |
| 2,985,848 | 5/61 | Raffaelli | 331—181 |
| 3,046,535 | 7/62 | Philbin | 340—199 |

FOREIGN PATENTS 484,423    5/38    Great Britain.

NEIL C. READ, *Primary Examiner.*

L. MILLER ANDRUS, THOMAS B, HABECKER,
*Examiners.*